Sept. 13, 1966   J. H. HAYES   3,272,985
INFRARED RADIOMETER-PHOTOGRAPHIC APPARATUS
Filed Dec. 11, 1963

INVENTOR.
Jack H. Hayes
BY Harry M. Saragovitz,
Edward J. Kelly &
Herbert Berl

Patented Sept. 13, 1966

3,272,985
INFRARED RADIOMETER-PHOTOGRAPHIC APPARATUS
Jack H. Hayes, El Paso, Tex., assignor to the United States of America as represented by the Secretary of the Army
Filed Dec. 11, 1963, Ser. No. 329,929
2 Claims. (Cl. 250—83.3)

The invention described herein may be manufactured and used by or for the Government for governmental purposes, without the payment to me of any royalty thereon.

It is often desirable to sense radiant energy being received from a distant object, such as a flying airplane. If the plane is illuminated by daylight, spotlights, or lighting in the plane itself then the light energy in the visible spectrum can be sensed by ordinary light sensitive photo or television equipment. Also, infra-red energy being generated by the engines, or being reflected from the sun, may be detected at great distances by highly sensitive, highly directional equipment.

The types of equipment mentioned above have been combined by prior inventors, for example M. T. Worst, Patent No. 3,053,932, and R. J. Bibbero, Patent No. 3,076,961. Thus, equipment has been devised to sense visible light or infra-red radiations or both. I have made improvements in apparatus of this nature.

Figure 1:
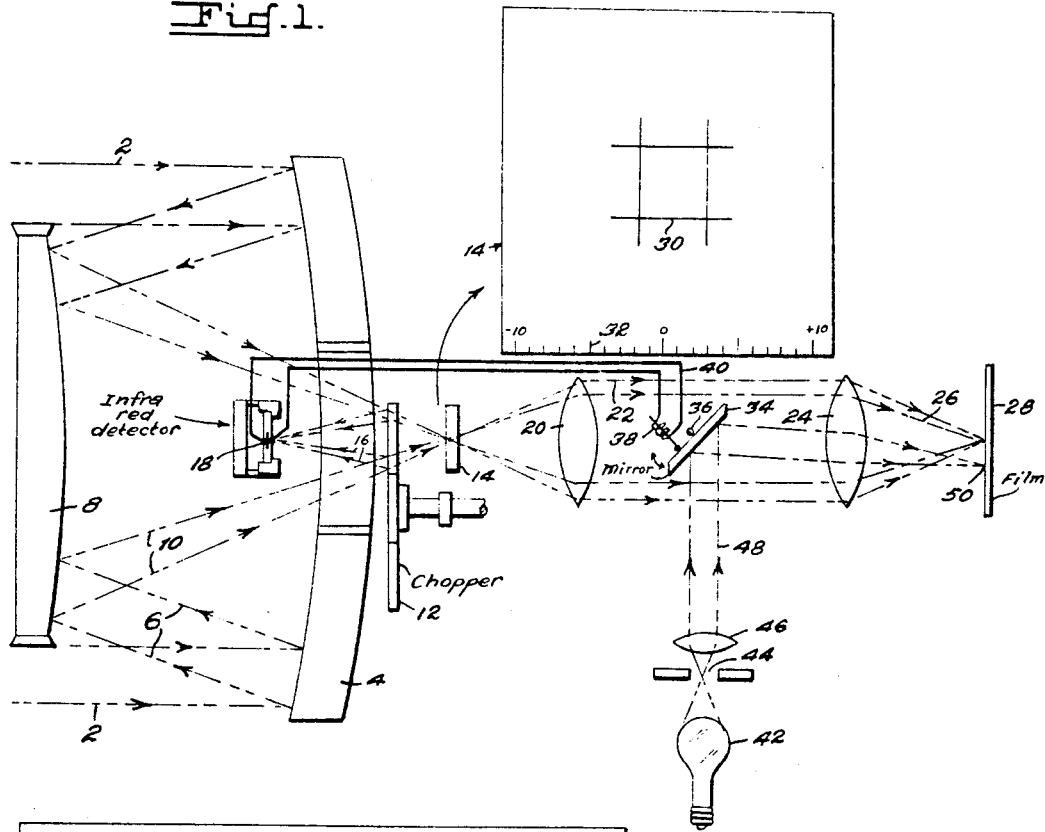
Figure 2:
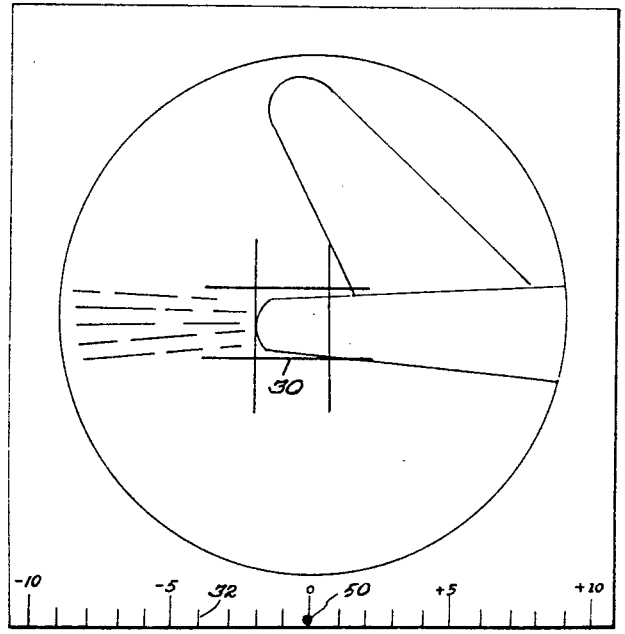

In the drawing:
FIGURE 1 is a diagrammatic illustration of the apparatus and,
FIGURE 2 illustrates the results obtainable by use of the apparatus.

In FIGURE 1 radiations, both visible and infra-red, are illustrated at 2 coming into the apparatus at the left side of the drawing. The radiations strike reflector 4 and are reflected back at 6 to reflector 8 and thence along converging paths 10. A rotating chopper is illustrated at 12 having one or more open areas to permit light rays 10 to pass therethrough to optical flat 14 for a moment. The chopper also has reflecting areas thereon alternating with the open areas to reflect radiations back at 16 to infra-red detector 18, in a manner well understood in the art. Other forms of choppers may be used if desired.

When an open area of the chopper permits radiations to pass to optical flat 14 they pass therethrough to collimating lens 20 and from lens 20 along path 22 to condensing lens 24, which may be the lens of a camera. Condensing lens 24 projects the radiations along paths 26 to a sensor of visible light 28, such as the film in a camera, where the nature and magnitude of the radiations can be recorded.

The optical flat 14 has a reticle 30 and scale 32 etched thereon and light passing therethrough projects an image of the reticle and scale onto the film 28.

Mirror 34 is pivotally mounted at 36 and is movable by electrical apparatus 38 in response to current flow in wires 40 generated by detector 18 (and amplified if necessary).

A source of light 42 projects a beam through hole 44 and lens 46. Resulting beams 48 strike mirror 34 and are reflected through condensing lens 24 of the camera to a point of convergence to form a spot 50 on film 28.

Operation of the apparatus is as follows. The entire detector assembly is focused on an object such as the tail section of an airplane illustrated in FIG. 2. Visible light rays and infra-red rays from the plane enter the apparatus as rays 2 in FIG. 1. These rays are reflected along paths 6, 10 and the visible rays are intermittently passed through chopper 12, thru optical flat 14, thru lenses 20, 24 to film 28. Thus, an image of the plane is impressed on film 28. Rays passing through optical flat 14 pick up images of reticle 30 and scale 32 and superimpose these images on the image of the plane as illustrated in FIG. 2.

Infra-red rays entering the apparatus at 2, 6, 10 are reflected intermittently by chopper 12, at 16 to infra-red detector 18. Detector 18 is the same size as reticle 30. Thus, the area for infra-red energy falling on detector 18 is equal to the area represented by reticle 30 as projected on film 28. The infra-red energy falling on detector 18 is converted to electrical energy and is transmitted thru wires 40 to apparatus 38 to move mirror 34 an amount proportional to the intensity of the infra-red energy striking detector 18. Movement of mirror 34 moves spot 50 along scale 32 thus giving an indication of the intensity of the infra-red energy received.

The lenses 20 and 24 should each have a $f$-number at least as fast as the collecting optics of the radiometer-photo apparatus, and the focal strength of the camera lens 24 should be longer than the focal length of lens 20 so that the image will be magnified.

A radiometer, to be sensitive, necessarily has an extremely small field-of-view and for this reason it is practically impossible to precisely boresight the radiometer with another instrument such as the TV cameras in the Worst and Bibbero patents mentioned previously. In such apparatus it is very difficult to point the radiometer at a given target and, once a reading is made, there is no way of knowing what percent of the field of view of the TV camera was filled by the target as seen by the infra-red radiometer.

The present apparatus permits use of a single optical system to gather and record information in both the visible and infra-red spectra on a single film. Duplication of expensive high-precision apparatus is avoided. Also, both pieces of detecting an recording equipment "see" the identically same subject matter and no attempt to coordinate and boresight the infra-red and visible light detectors is necessary. Thus, far superior equipment and results are obtained with much more simple equipment.

I claim:
1. Apparatus for receiving radiations from an object in both the visible and the infra-red spectrums comprising: condensing reflector apparatus to concentrate the radiations;
a chopper, to pass the radiations and to reflect the radiations alternately, placed in the path of radiations being received;
a detector located to intercept infra-red type of radiations being received;
a detector located to intercept visible type radiations being received;
the apparatus thereby utilizing the same condensing reflector apparatus to concentrate both types of radiations and wherein the chopper reflects incoming radiations to the infra-red detector at one period of time and passes incoming radiations on through the systems to the second-mentioned detector at another period of time.
2. Apparatus for receiving radiations from an object in both the visible and the infra-red spectrums comprising: condensing reflector apparatus to concentrate the radiations; a chopper, to pass the radiations and to reflect the radiations alternately, place in the path of radiations being received; a first detector located to intercept infra-red type of radiations being received; a second detector located to intercept visible type radiations being received; the apparatus thereby utilizing the same condensing reflector apparatus to concentrate both types of radiations; an optical flat with reticle and scale indicia thereon through which the visible type radiations pass after passing through the chopper; said second detector comprising film on which the radiations fall and on which the image of the reticle and scale indicia of the optical flat is projected and; a source of light generating a beam adapted for being projected on the film in the area of the scale indicia, means to cause the projected beam to move along the scale indicia, the detector which is located to intercept infra-red type radiations generating electrical current proportional to the radiations received, and wherein the current so generated is fed to the means to cause the projected beam to move whereby the projected beam of light will move along the scale indicia proportional to the intensity of the infra-red radiations falling on the infra-red detector.

References Cited by the Examiner

UNITED STATES PATENTS

| | | | |
|---|---|---|---|
| 2,650,308 | 8/1953 | Catlin | 250—65 |
| 2,974,230 | 3/1961 | Harris | 250—83.3 |
| 2,989,643 | 6/1961 | Scanlon | 250—83.3 |
| 3,053,932 | 9/1962 | Worst | 250—83.3 |
| 3,076,961 | 2/1963 | Bibbero | 250—83.3 |
| 3,169,189 | 2/1965 | Barnes | 250—83.3 |

RALPH G. NILSON, *Primary Examiner.*

JAMES W. LAWRENCE, *Examiner.*

S. ELBAUM, *Assistant Examiner.*